(12) United States Patent
Gao et al.

(10) Patent No.: US 11,190,131 B2
(45) Date of Patent: Nov. 30, 2021

(54) METHOD AND SYSTEM FOR POWER PREDICTION OF PHOTOVOLTAIC POWER STATION BASED ON OPERATING DATA OF GRID-CONNECTED INVERTERS

(71) Applicant: SHANDONG UNIVERSITY, Shandong (CN)

(72) Inventors: Feng Gao, Jinan (CN); Xiangjian Meng, Jinan (CN); Tao Xu, Jinan (CN); Chenghui Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/267,918

(22) PCT Filed: May 16, 2019

(86) PCT No.: PCT/CN2019/087154
§ 371 (c)(1),
(2) Date: Feb. 11, 2021

(87) PCT Pub. No.: WO2020/215405
PCT Pub. Date: Oct. 29, 2020

(65) Prior Publication Data
US 2021/0194424 A1    Jun. 24, 2021

(30) Foreign Application Priority Data

Apr. 25, 2019  (CN) .......................... 201910338873.6

(51) Int. Cl.
*H02S 50/00* (2014.01)
*H02S 40/32* (2014.01)
*H02J 3/00* (2006.01)

(52) U.S. Cl.
CPC .............. *H02S 50/00* (2013.01); *H02J 3/004* (2020.01); *H02S 40/32* (2014.12); *H02J 2300/24* (2020.01)

(58) Field of Classification Search
None
See application file for complete search history.

(56) References Cited

U.S. PATENT DOCUMENTS

| 2012/0035887 A1* | 2/2012 | Augenbraun | G06T 15/06 703/1 |
| 2016/0026740 A1* | 1/2016 | Herzig | G01W 1/12 703/2 |
| 2018/0046924 A1* | 2/2018 | Huang | G06N 5/04 |

FOREIGN PATENT DOCUMENTS

| CN | 106452355 A | 2/2017 |
| CN | 108388956 A | 8/2018 |
| CN | 109934423 A | 6/2019 |

OTHER PUBLICATIONS

Feb. 1, 2020 International Search Report issued in International Patent Application No. PCT/CN2019/087154.

(Continued)

*Primary Examiner* — Mohammad Ali
*Assistant Examiner* — Saad M Kabir
(74) *Attorney, Agent, or Firm* — Oliff PLC (57) ABSTRACT

The present disclosure provides a method and system for power prediction of a photovoltaic power station based on operating data of grid-connected inverters, including: constructing a photovoltaic module model according to parameters of a photovoltaic module in a photovoltaic power station; constructing a power prediction model based on an artificial neural network algorithm; acquiring output data of a photovoltaic array when being shaded by static shadows of different thicknesses and different shading areas, constructing a training set to train the power prediction model, and obtaining a trained power prediction model; and acquiring, classifying, and normalizing output powers in real-time operating data of an inverter when the photovoltaic array is under a clear sky condition, and predicting a output power of the entire photovoltaic power station by using the trained power prediction model, the power prediction including a rolling prediction of the output power of the photovoltaic power station under a clear sky condition and a minute-level power prediction of the photovoltaic power station when being shaded by a dynamic cloud cluster. The present disclosure reduces a device cost and overcomes the defect that cloud clusters of different thicknesses affect the precision of power prediction of the photovoltaic array.

9 Claims, 5 Drawing Sheets

(56) References Cited

OTHER PUBLICATIONS

Feb. 1, 2020 Written Opinion issued in International Patent Application No. PCT/CN2019/087154.
Jul. 30, 2019 Search Report issued in Chinese Patent Application No. 201910338873.6.
First Office Action issued in Chinese Patent Application No. 201910338873.6.
Second Office Action issued in Chinese Patent Application No. 201910338873.6.
Litao Han. "Research on Ultra-Short-Term Photovoltaic Power Prediction Considering Cloud Sheltering". Engineering Technology II, China Master's Theses Full-Text Database, No. 04, Apr. 15, 2019, pp. 24-45.

\* cited by examiner

METHOD AND SYSTEM FOR POWER PREDICTION OF PHOTOVOLTAIC POWER STATION BASED ON OPERATING DATA OF GRID-CONNECTED INVERTERS

BACKGROUND

Technical Field

The present disclosure relates to the field of power prediction technologies, and in particular, to a method and system for power prediction of a photovoltaic power station based on operating data of grid-connected inverters.

Related Art

As a renewable energy source with an endless supply, solar energy is an ideal substitute for traditional energy. An output power of a photovoltaic array highly depends on meteorological parameters including irradiance, environment temperature, relative humidity, volume, wind speed, and the like. When the meteorological parameters change greatly, the output power of the photovoltaic array fluctuates sharply. When a high-capacity photovoltaic power station is disturbed by cloud cluster shading or other disturbance factors, the power fluctuation severely challenges the stability of grid operation. Therefore, it is necessary to study the power prediction technology of a photovoltaic power station. Photovoltaic power generation prediction models in the existing patents and literature may be classified into two categories, including a statistical prediction model and a physical prediction model. According to the statistical prediction model, a prediction model is constructed through deep learning. A nonlinear mapping relationship between historical meteorological data and historical generated powers is established through training of large amount of data, and then a future numerical weather forecast parameter is inputted into a trained prediction model to obtain a power prediction result of the photovoltaic power station. According to the physical prediction model, an output power of an array is predicted based on a constructed photovoltaic cell panel and inverter model in combination with future meteorological parameters obtained by numerical weather forecast, an inclination angle of the photovoltaic array, a geographic location of the photovoltaic power station, and other information, and further, an output power of the entire photovoltaic power station is predicted.

Solar irradiance is the most important factor that affects the photovoltaic generated power. In power prediction with high temporal resolution, impact of cloud cluster movement on the output of the photovoltaic power station needs to be considered.

It is found in the research that, in current cloud cluster forecast, images are acquired by using a dedicated device, and shading of a photovoltaic power station by a cloud cluster in the future is predicted by using an image analysis technology. However, the method is limited in some degree. A common weather satellite cloud image has a relatively low spatial resolution, and each pixel point corresponds to a relatively large area. Therefore, it is impossible to accurately predict a cloud layer movement in a small area. If a ground-based cloud image is used, and a cloud layer is continuously photographed and analyzed by using a ground device, only information of a cloud cluster in a relatively small area can be obtained. When the cloud cluster moves fast, a time scale of the prediction is reduced greatly, and it is difficult to obtain thickness information of the cloud layer. Therefore, it is difficult to accurately determine an irradiance variation, and a prediction error is increased. In addition, when the photovoltaic power station is large, a large quantity of sky imagers are needed, greatly increasing the costs.

Based on the above, the inability to make a high-precision prediction of an output power fluctuation of the photovoltaic array caused by a cloud cluster or other disturbance factors becomes a bottleneck restricting the precision of high-temporal-resolution power prediction of the photovoltaic power station.

SUMMARY

An objective of the implementations in the specification is to provide a method for power prediction of a photovoltaic power station based on operating data of grid-connected inverters. The method has high universality, and is capable of making high-precision power predictions under various weather conditions such as a cloudless condition, rainy and snowy conditions, and a cloudy condition. The obtained data does not need to be classified according to different weather conditions.

The implementations in the specification provide a method for power prediction of a photovoltaic power station based on operating data of grid-connected inverters, and the method is implemented through the following technical solutions, including:

constructing a photovoltaic module model according to parameters of a photovoltaic module in a photovoltaic power station, constructing a photovoltaic array model based on a series and parallel combination of the photovoltaic module models, and establishing a photovoltaic power station model based on an arrangement structure of photovoltaic arrays in the photovoltaic power station;

constructing a photovoltaic array power prediction model based on an artificial neural network algorithm and the photovoltaic power station model;

acquiring output data of the photovoltaic array when being shaded by static shadows of different thicknesses and different shading areas, constructing a training set to train the photovoltaic array power prediction model, and obtaining a trained photovoltaic array power prediction model; and acquiring, classifying, and normalizing output powers of real-time operating data of an inverter when the photovoltaic array is under a clear sky condition or a shading condition, predicting an output power of the entire photovoltaic power station by using the trained photovoltaic array power prediction model, the power prediction including a rolling prediction of the output power of the photovoltaic power station under the clear sky condition and a minute-level power prediction of the photovoltaic power station when being shaded by a dynamic cloud cluster.

The implementations in the specification provides a system for power prediction of a photovoltaic power station based on operating data of grid-connected inverters, and the system is implemented through the following technical solutions, including:

an offline learning module, configured to construct a photovoltaic module model according to parameters of a photovoltaic module in a photovoltaic power station, construct a photovoltaic array model based on a series and parallel combination of the photovoltaic module models, and establish a photovoltaic power station model based on an arrangement structure of photovoltaic arrays in the photovoltaic power station;

construct a photovoltaic array power prediction model based on an artificial neural network algorithm and the photovoltaic power station model; and acquire output data of the photovoltaic array when being shaded by static shadows of different thicknesses and different shading areas, construct a training set to train the photovoltaic array power prediction model, and obtain a trained photovoltaic array power prediction model; and an online prediction module, configured to acquire, classify, and normalize output powers of real-time operating data of an inverter when the photovoltaic array is under a clear sky condition or a shading condition, predict output power of the entire photovoltaic power station by using the trained photovoltaic array power prediction model, the power prediction comprising a rolling prediction of the output power of the photovoltaic power station under the clear sky condition and a minute-level power prediction of the photovoltaic power station when being shaded by a dynamic cloud cluster.

Compared with the prior art, the present disclosure has the following beneficial effects.

To solve the defects such as high costs and low accuracy of the existing cloud image technology, the present disclosure provides, based on a deep learning algorithm, a method for realizing power prediction of a photovoltaic power station by acquiring and storing output powers of photovoltaic arrays under cloud clusters of different types. There is no need to analyze ground cloud images or satellite cloud images, thereby reducing device costs and overcoming the defects that cloud clusters of different thicknesses affect the precision of power prediction of the photovoltaic array.

Different from a solution in which a power of a photovoltaic power station is predicted offline based on historical meteorological parameters and historical data of the photovoltaic power station, during construction of a training set of a prediction model, the present disclosure only needs to acquire offline data of a single photovoltaic array model under different shading conditions, train a neural network model by using the acquired data as a training set, and obtain output data of the photovoltaic array under all shading situations without using historical meteorological parameters or historical operating data of the power station, thereby greatly reducing a required data volume.

Different from a conventional power prediction method which only achieves high precision in a single weather condition, the method disclosed herein has higher universality, and is capable of making high-precision power predictions in various weather conditions such as a cloudless condition, rainy and snowy conditions, and a cloudy condition. The obtained data does not need to be classified according to weather conditions.

BRIEF DESCRIPTION OF THE DRAWINGS

The accompanying drawings constructing a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

Embodiment 1

This embodiment discloses a method for power prediction of a photovoltaic power station based on operating data of grid-connected inverters, including:

Step (1). Establish a photovoltaic module model with high portability, replicability, and versatility based on parameters of a photovoltaic module and a photovoltaic array structure in a target photovoltaic power station by using a Newton's method. An actual photovoltaic module is connected to an adjustable load, and a volt-ampere characteristic curve of the photovoltaic module can be obtained by adjusting a voltage of the photovoltaic module in a range of zero to an open-circuit voltage at a fixed step and acquiring output current values of the photovoltaic module under different voltage values; a volt-ampere characteristic curve of the photovoltaic module under different irradiances can be obtained by using a dedicated device to change an irradiance received by the actual photovoltaic module. The obtained two actual volt-ampere characteristic curves are compared with a volt-ampere characteristic curve obtained based on the photovoltaic module model to correct related parameters of the photovoltaic module model, thereby improving simulation precision of the model.

In an embodiment, the dedicated device may be an instrument configured to simulate solar radiation, such as a solar simulator.

Step (2). Construct a photovoltaic array model based on a series and parallel combination of the photovoltaic module models, acquire and store, by changing an irradiance parameter of the photovoltaic module, output voltages, currents, and powers of the photovoltaic array model with shading by a plurality of static shadows of different thicknesses, sizes, and shapes.

Step (3). Classify and normalize the data obtained in step (2), and establish a photovoltaic array power prediction model based on a deep learning algorithm such as an artificial neural network, and train the established photovoltaic array power prediction model by using processed data as a training set, to predict an output voltage, current, and power of the photovoltaic array shaded by a static shadow of any thickness, size, and shape.

Step (4). Specifically, establish a photovoltaic power station model based on an arrangement structure of the photovoltaic arrays in the photovoltaic power station by using a single photovoltaic array and a connected photovoltaic inverter as a smallest unit, and number a position of each smallest unit in the photovoltaic power station model. For the target photovoltaic power station, dynamic shading conditions of different types are set, including information such as a moving speed, a direction, and a shape of a simulated cloud cluster, an irradiance change of the photovoltaic array, and the like. The output voltage and current of each photovoltaic array in the photovoltaic power station model under the various set dynamic shading conditions are acquired and stored. The photovoltaic array power prediction model is established based on the artificial neural network. The stored output voltage and current of each photovoltaic array in the photovoltaic power station model is used for training the photovoltaic array power prediction model.

In this embodiment, an objective of step (3) is to optimize parameters of the photovoltaic array power prediction model, so that the photovoltaic array power prediction model can make a high-precision prediction of an output power of the photovoltaic array in any shading situation based on obtained data. However, in an actual application, hardware parameters of photovoltaic power stations are different. In practical application of step (4), data needs to be acquired based on actual operating data and shading situation of the photovoltaic arrays in the target photovoltaic power station to train the artificial neural network model.

The photovoltaic array power prediction model mentioned in step (3) is used for predicting powers of a photovoltaic array under different working conditions, and a prediction object is not the photovoltaic power station. A prediction object of the photovoltaic array power prediction model mentioned in step (4) is the entire photovoltaic power station.

The photovoltaic module is the smallest unit for the power prediction of the present disclosure. A plurality of photovoltaic module models form a photovoltaic array model, and a plurality of photovoltaic array models form a photovoltaic power station model. Different power stations have photovoltaic arrays of different structures, and also have different internal structures. Therefore, in practical application, it is necessary to model the entire power station based on an actual arrangement structure inside the photovoltaic power station, and predict a power of the photovoltaic power station based on the established model.

Step (5). Change output consistency of the photovoltaic arrays in the photovoltaic power station to simulate impact caused by dust and the like, and repeat step (4) to obtain a power prediction model of the photovoltaic power station.

Step (6). Establish a data terminal based on an existing real-time monitoring system in the photovoltaic power station and a device having a data storage function and a communication module, to carry out calculation related to power prediction based on an artificial neural network model and acquire and store real-time operating data of inverters.

Step (7). Acquire, classify and normalize, in the same way as that in as step (3), output powers of the photovoltaic arrays under a clear sky condition. Because the photovoltaic power station has a relatively large area, it is difficult to regularly clean all photovoltaic arrays. As a result, there is dust on surfaces of the photovoltaic modules. Due to a large quantity of photovoltaic arrays and a large distribution area, thicknesses of dust accumulated on surfaces of photovoltaic arrays in different areas are different, leading to different output powers of the inverters under the same clear sky condition. Therefore, when an external irradiance changes greatly due to cloud cluster shading or other reasons, power variations of the photovoltaic arrays are different. Therefore, during power prediction, different output powers of the photovoltaic arrays under the clear sky condition need to be considered, to improve the accuracy of the prediction. Due to a large quantity of the photovoltaic arrays, there are also a large quantity of output power values under the clear sky condition. In order to reduce a data processing volume, the output powers of the photovoltaic arrays may be classified according to a specific classification method, to be used as one of the inputs in the training set in step (3) to train the artificial neural network.

Due to a large quantity of photovoltaic arrays and inverters inside a large photovoltaic power station, the amount of calculation is greatly increased. A main objective of step (7) is to classify the photovoltaic arrays in the entire power station, so that photovoltaic arrays having similar output powers under the same working condition are considered as a group. Because a shading area of a cloud cluster is generally large, when the photovoltaic power station is shaded, a power prediction may be made by using a group as a unit, thereby greatly reducing the amount of calculation. The same working condition refers to the clear sky condition described herein. Different outputs of the photovoltaic arrays under the clear sky condition represent different thicknesses of dust on the surfaces of the photovoltaic arrays.

Step (8). Predict an output power of the entire photovoltaic power station based on the real-time operating data of the inverters. The power prediction may be divided into two parts. The first part is a rolling prediction of the output power of the photovoltaic power station under the clear sky condition, and the second part is a minute-level power prediction of the photovoltaic power station when being shaded by a dynamic cloud cluster.

A specific method is as follows.

A parameter considered in the rolling prediction of the output power of the photovoltaic power station under the clear sky condition is solar irradiances at different moments. Due to the impact caused by dust on the output powers of the photovoltaic arrays as stated in step (6), output powers of photovoltaic arrays in different regions are different at the same moment. As time goes by, the solar irradiance received by the ground changes accordingly. The shading by the dust causes the irradiance to change, and has different impact on the output powers of the different photovoltaic arrays. The inverter is used as the smallest power prediction unit. The output power of the inverter refers to the output power of the photovoltaic array mentioned above, that is, the photovoltaic array model established in step (3). According to different output powers of each inverter in the photovoltaic power station at the previous moments, an output power of each inverter in the future is predicted, to achieve a high-precision prediction of the output power of the photovoltaic power station under the clear sky condition.

In the minute-level power prediction of the photovoltaic power station when being shaded by a dynamic cloud cluster, impact on irradiance s of the photovoltaic arrays when the dynamic cloud cluster passes through the region of the photovoltaic power station is considered. When a photovoltaic array is shaded by a cloud cluster, a real-time output current, voltage and output power as well as a position number of an inverter connected to the photovoltaic array are transmitted to the data terminal by using a communication system. According to a sequence in which the photovoltaic arrays at different positions are shaded, an initial position, a movement direction, and a movement speed of the cloud cluster may be predicted. At the same time, by acquiring changes of output parameters of the photovoltaic inverters after the photovoltaic arrays are shaded, future output powers of photovoltaic arrays that have not been shaded within a cloud cluster movement trajectory may be predicted based on the trained power prediction model, so that a power of the photovoltaic power station is accurately predicted when the dynamic cloud cluster passes through the region of the photovoltaic power station.

The present disclosure samples and stores the inverter operating data, and by using an analysis method based on the operating data of the grid-connected inverters, reduces a prediction interval of a conventional ultra-short-term power prediction from 0-4 hours to several minutes.

Compared with the conventional method for power prediction of a photovoltaic power station, the power prediction in the present disclosure has higher spatial resolution, and can be adjusted according to a speed and size of a cloud cluster. When the cloud cluster moves slowly or the cloud cluster is small, an output power of a single photovoltaic array may be used as a smallest power prediction unit to predict a power of the entire photovoltaic power station. When the cloud cluster moves fast or the cloud cluster is large, output powers of a plurality of photovoltaic arrays or a plurality of inverters may be used as a smallest power prediction unit.

In a conventional power prediction method, a future output power of a photovoltaic power station is predicted according to irradiance data without considering impact of dust shading and other factors on an output power of a photovoltaic array. In the present disclosure, based on different output powers of photovoltaic arrays under the same clear sky condition, a prediction result of a future output power is corrected by analyzing inconsistency of photovoltaic array working conditions caused by dust shading, to improve prediction precision.

In the step (1), the photovoltaic module model is a five-parameter model of the photovoltaic module established based on a Newton's method according to the following principle: based on each parameter value under a standard test condition, the five parameters under an actual working condition, namely a diode ideality factor A, a series resistance $R_S$, a parallel resistance $R_{sh}$, a saturation current $I_{ph}$, and a photo-generated current $I_s$ are calculated, and finally a volt-ampere characteristic curve under different working conditions is obtained. When the diode ideality factor is given, a calculation formula of the other four parameters is as follows:

$$R_S = R_S^*$$

$$R_{sh} = \left(\frac{S}{S^*}\right) R_{sh}^*$$

$$I_s = I_s^* \left(\frac{T_c}{T_c^*}\right)^3 e^{\left(\frac{qE_g^*}{kA}\right)\left[\left(\frac{1}{T_c^*}\right)-\left(\frac{1}{T_c}\right)\right]}$$

$$I_{ph} = \left(\frac{S}{S^*}\right)[I_{ph}^* + C_T(T_c - T_c^*)]$$

where $C_T$ is a temperature coefficient; $V^*_{OC}$ and $I^*_{SC}$ are an open-circuit voltage and a short-circuit current under a standard test condition (STC) respectively; $R^*_s$, $R^*_{sh}$, $I^*_{ph}$, $S^*$, $T^*_c$, and $E^*_g$ are a series resistance, a parallel resistance, a saturation current, a working temperature, an irradiance, and a band gap under the standard test condition respectively; S is an irradiance under an actual working condition; $T_c$ is a working temperature under an actual working condition; k is a Boltzmann constant; and e is an electron charge.

When the five parameters under the actual working condition are calculated, a relationship between the output voltage and the output current of the photovoltaic module may be calculated by using the following formula:

$$I = I_{ph} - I_S\left(\exp\left[\frac{q(V + IR_S)}{AkT_C}\right] - 1\right) - \frac{V + IR_S}{R_{sh}}$$

The output voltage and current of the photovoltaic module are in a complex non-linear relationship, it is difficult to solve the relationship directly. Therefore, the Newton's method is used to calculate an output current value under a specified output voltage value. First, a volt-ampere characteristic formula of the photovoltaic module is transformed to obtain:

$$f(I) = I - I_{ph} + I_S\left(\exp\left[\frac{q(V + IR_S)}{AkT_C}\right] - 1\right) + \frac{V + IR_S}{R_{sh}}$$

V is considered as known, and as long as a solution I to f(I) is solved, the current value under the corresponding voltage value is obtained. To apply the Newton's method, the derivative of f(I) needs to be taken:

$$\frac{df(I)}{dI} = 1 + \frac{qR_S I_S}{AkT_C}\left(\exp\left[\frac{q(V + IR_S)}{AkT_C}\right]\right) + \frac{R_S}{R_{sh}}$$

A specific step for obtaining an I-V curve under the actual working condition based on the Newton's method is as follows:

First, a voltage value $V_0$ at a working point of the photovoltaic module is given. In this case, in f(I) and df(I), only a current value is unknown. An initial current value is set to $I_0$, and then values corresponding to f(I) and df(I) can be obtained and are substituted into a formula of the Newton's method, that is:

$$I_1 = I_0 - \frac{f(I_0)}{f'(I_0)}$$

The foregoing step is repeated, and a more precise current value can be obtained after n iterations.

$$I_n = I_{n-1} - \frac{f(I_{n-1})}{f'(I_{n-1})}$$

If a sufficient quantity of iterations are ensured, a finally calculated current value is more accurate, and the finally obtained $I_n$ is a corresponding current value when the working voltage of the photovoltaic module is $V_0$. A volt-ampere characteristic curve of the photovoltaic module under a specific working condition may be obtained based on the Newton's method by accumulating $V_0$ from 0 to an open circuit voltage at a small and fixed step. A volt-ampere characteristic curve of the photovoltaic module under different working conditions may be obtained by changing the working condition of the photovoltaic module, that is, the five parameters mentioned in step (1). Data processing is performed based on series and parallel characteristics of the photovoltaic modules by using one photovoltaic module as a smallest unit, and a volt-ampere characteristic curve of the entire photovoltaic array is finally obtained.

In step (1), the portability means that output characteristics of photovoltaic arrays of different scales and different structures can be simulated through permutation and combination of photovoltaic modules. The high replicability means that a single photovoltaic array model can be extended to a photovoltaic power station model based on an array arrangement structure in the photovoltaic power station. The high versatility means that a working condition of each photovoltaic module may be set separately, and output characteristics of a photovoltaic array under a complex working condition such as a non-uniform irradiance can be simulated.

The simulation of output voltages, currents, and powers of the photovoltaic array model with shading by a plurality of static shadows of different thicknesses, sizes, and shapes in step (2) may be specifically as follows.

Considering the limitation of a rated current of a single DC input channel of the inverter, a photovoltaic array in the photovoltaic power station is usually of a structure of 2×N, and N is usually about 20. By using a photovoltaic module as the smallest resolution, if a shading cloud cluster is of a fixed and uniform thickness, there are (N+1)! different shading situations to make the output power of the photovoltaic array different. If a target array is relatively large, there are an extremely large quantity of shading situations. If shading by cloud clusters of different thicknesses or a cloud cluster of a non-uniform thickness is also considered, the shading situations become more complex. Therefore, data acquisition of a photovoltaic array of 2×N is used as an example. Assuming that impact of different cloud cluster thicknesses on an irradiance received by the photovoltaic module can be reduced from 1000 W/m² in a standard working condition to a range of A W/m² to B W/m². By using 10 W/m² as the smallest resolution, there are clouds of (A−B)/10 different thicknesses. In this case, if relatively complete working conditions of a single photovoltaic array need to be acquired, (N+1)!×(A−B)/10 shading manners need to be set for data acquisition. If a numerical value of N is relatively large, types of working conditions increase exponentially, and an extremely large volume of data needs to be acquired. Therefore, it is hard to implement data acquisition for output powers of the photovoltaic array in all working conditions. The acquisition of the output powers of the photovoltaic array when being shaded by static shadows of different thicknesses, sizes, and shapes herein is not to acquire output data of the photovoltaic array in all shading situations; instead, by setting a plurality of shelters of known thicknesses, various shading situations of the shelter of each thickness are simulated, and output voltages, currents, and powers of the photovoltaic array under the different shading situations are acquired and stored.

In step (3), the classifying and normalizing the data obtained in step (2) is specifically as follows:

simulating and acquiring outputs of the photovoltaic array under different working conditions, and classifying the output data of the photovoltaic array according to irradiances under the clear sky condition. For example, an irradiance range under the clear sky condition is 0 to 1000 W/m², and if every P W/m² is used as an interval, the acquired original data may be divided into 1000/P groups. Each group of data forms a training set to train the artificial neural network, thereby improving the precision of the artificial neural network.

The acquired original output data of the photovoltaic array needs to be normalized before being used for training the artificial neural network, and a linear transformation is performed on the original data so that a result is mapped to a range of 0 to 1. The transform function is as follows:

$$x^* = \frac{x - x_{min}}{x_{max}}$$

where max is a maximum data value, min is a minimum data value, x is original sample data, and x* is a numerical value after sample normalization.

In step (3), the construction and training of the photovoltaic array power prediction model may be divided into two steps.

Step 1. Predict impact of a cloud cluster of a specified thickness, any size, and any shape on the output power of the photovoltaic array. Clouds of a specified thickness are set, and shading of the array by static cloud clusters of different sizes and different shapes is simulated by changing an irradiance received by each module in the photovoltaic array. A plurality groups of output voltages, currents, and powers of the photovoltaic array when being shaded by shadows of the same thickness and different shading areas are acquired for training the artificial neural network. By using a photovoltaic array of a structure of 2×N as an example, an input of the artificial neural network model has four dimensions, which are the quantity of shaded modules on a first branch, the quantity of shaded modules on a second branch, an irradiance of an unshaded photovoltaic module, and an irradiance of a shaded photovoltaic module, respectively. An output of the artificial neural network model has three dimensions, which are an output voltage, an output current, and an output power of the photovoltaic array, respectively. For example, a simulated working condition is that three photovoltaic modules on the first branch of the photovoltaic array are shaded, five photovoltaic modules on the second branch are shaded, the irradiance of the shaded photovoltaic array becomes 250 W/m², and an output power of the photovoltaic array after being shaded by a cloud cluster changes from 9820 W to 5000 W; the output voltage and current are $V_s$, and $I_s$. To reduce the data processing volume, an output power of an inverter under a clear sky condition is classified in a rounding-off manner by using 100 W as the smallest resolution. In this case, an input corresponding to the artificial neural network is (3, 5, 9800, 250), and an output is ($V_s$, $I_s$, 5000). Acquired data is divided into two groups. One group is used as a training set to train the artificial neural network, and the other group is used as a verification set to verify the precision of the artificial neural network. By comparing a prediction result with the verification set, and optimizing an artificial neural network algorithm to improve prediction precision, the output power of the photovoltaic array shaded by a cloud cluster of a specified thickness, any size, and any shape can be predicted.

Step 2. Predict impact of a cloud cluster of any thickness, any size, and any shape on the output power of the photovoltaic array. Based on the prediction result in step (1), the output powers of the photovoltaic array when being shaded in all manners by a cloud cluster of a specified thickness can be obtained. By setting the thickness of the cloud cluster and repeating step 1, output data of the photovoltaic array when being shaded by a plurality of cloud clusters of different thicknesses, any size, and any shape can be obtained. By using such output data as a training set, an output power of the photovoltaic array shaded by a static cloud cluster of any thickness, any shape, and any size can be predicted based on the constructed artificial neural network prediction model.

In step (4), a specific implementation of establishing a photovoltaic power station model based on an arrangement structure of the photovoltaic arrays in the photovoltaic power station, and numbering a position of each photovoltaic array or photovoltaic inverter in the power station model is as follows:

By using a portability of the photovoltaic array in combination with a real structure and arrangement of photovoltaic arrays in the photovoltaic power station, photovoltaic arrays in different scales are constructed. By using the replicability of the array and by using a single photovoltaic array model as the smallest unit, a photovoltaic power station model is constructed based on a spatial characteristic of the photovoltaic arrays in the photovoltaic power station. The spatial characteristic of the photovoltaic array arrangement in the photovoltaic power station may be simulated based on different shading moments and different shading areas of different photovoltaic arrays by the same dynamic cloud cluster Positions of the photovoltaic arrays in the photovoltaic power station model are numbered, and position information of a cloud cluster is provided for a data terminal.

In the present disclosure, a photovoltaic array model, a photovoltaic array power prediction model, and a photovoltaic power station model are constructed. A power prediction of the photovoltaic power station model is made by acquiring array data, training an artificial neural network model, and establishing the photovoltaic power station model, and a neural network is optimized based on a predication result. By acquiring and analyzing real-time operating data of each inverter of the photovoltaic power station, an output power of the photovoltaic power station when being shaded by a cloud cluster or under a clear sky condition is predicted based on a trained artificial neural network model.

A high-precision photovoltaic array model is constructed in the following manner: a photovoltaic module is modeled based on parameters of the photovoltaic module used in the photovoltaic power station, photovoltaic arrays of different structures and different scales are constructed by using the photovoltaic module as the smallest unit, and the photovoltaic arrays of different structures in the photovoltaic power station are simulated.

Structures of the photovoltaic arrays in the photovoltaic power station are basically the same. Therefore, the entire photovoltaic power station can be modeled based on a single photovoltaic array model according to an internal structure of the photovoltaic power station.

A working condition of each photovoltaic module in the photovoltaic array model can be set separately, so that an output of the photovoltaic array under any shading situation can be simulated.

Data is acquired based on the constructed photovoltaic array model, and corresponding output voltages, currents, and powers of the photovoltaic array are acquired and stored by changing an irradiance received by each photovoltaic module in the model and simulating shading of the photovoltaic array by shadows of different thicknesses, sizes, and shapes.

Output data of a single photovoltaic array under different working conditions is obtained through data acquisition, and the obtained data is classified according to different shading thicknesses, to construct a plurality of training sets to train the artificial neural network. Based on the plurality of training sets, output voltages, currents, and powers of the photovoltaic array when being shaded by shadows of different thicknesses, any sizes, and any shape can be predicted. The prediction results are formed into a training set to train the artificial neural network model again, to implement a prediction of an output voltage, current, and power of the photovoltaic array when being shaded by a shadow of any thickness, any size, and any shape.

By using the photovoltaic array model as the smallest unit, a photovoltaic power station model with a spatial characteristic is established based on an actual arrangement structure of the photovoltaic arrays in the photovoltaic power station. By dynamically changing an irradiance received by each photovoltaic module in different photovoltaic arrays, the output power of the photovoltaic power station when being shaded by a dynamic cloud cluster is simulated.

By predicting the output power of the photovoltaic power station when being shaded by a cloud cluster, a mapping between output data of the photovoltaic array and shading situations can be established based on training of an artificial neural network model. Output powers of photovoltaic arrays before being shaded are processed, and the size, shape, and contour of the cloud cluster can be determined by analyzing actual output data of each photovoltaic array after being shaded by the cloud cluster. Based on position information of each photovoltaic array included in the photovoltaic power station model having a spatial characteristic constructed in claim 5, a movement direction of the cloud cluster is determined according to a changing sequence of the output powers of the photovoltaic arrays, and a movement speed of the cloud cluster is determined based on a distance between arrays, so as to predict a movement trajectory of the cloud cluster. In combination with a prediction result of the artificial neural network, output powers of photovoltaic arrays to be shaded within the movement trajectory of the cloud cluster can be predicted, to predict the output power of the photovoltaic power station when being shaded by the cloud cluster.

The output power of the photovoltaic array before being shaded is processed in the following manner:

Different output powers of the photovoltaic arrays caused by the dust accumulated on the surfaces may affect the precision of the power prediction implemented based on the operating data of the inverters. Therefore, during power prediction, different output powers of the photovoltaic arrays under the clear sky condition need to be considered, to improve the accuracy of the prediction. Due to a large quantity of inverters and different outputs of the inverters, when a plurality of inverters are shaded in the same way, a large amount of data needs to be acquired and the shading situations of the inverters need to be determined based on a neural network model, which greatly increases the system workload. If operating data of the inverters under the clear sky condition and in a shading situation is divided by using an R W as an interval, output powers of the inverters may be divided into T groups:

$$T = \frac{P_{max} - P_{min}}{R}$$

where $P_{max}$ is a maximum output power of the inverter under a certain clear sky condition, and $P_{min}$ is a minimum output power of the inverter under a certain clear sky condition. In this way, the output powers of the inverters can be classified according to an interval, and is divided into T groups: $(P_{min}, P_{min}+R)$, $(P_{min}+R, P_{min}+2R)$, ..., and $(P_{max}-R, P_{max})$. Data processing is performed on the output power of each group of inverters according to $P_{min}+\frac{1}{2}$ R, $P_{min}+3/2R$, ..., and $P_{max}-\frac{1}{2}R$. In this way, a system data processing volume can be reduced while high precision is ensured.

The output power of the photovoltaic power station under a clear sky condition is predicted in the following manner: based on a communication system of the photovoltaic power station, a future changing trend of the output power can be predicted according to the output powers of each inverter at previous moments. As time changes, the variation of the irradiance is a temporal variation. Therefore, a high-precision prediction of the output power of the photovoltaic power station under a clear sky condition can be made based on a recurrent neural network or another regression algorithm by using an inverter as the smallest unit.

Embodiment 2

Figure 1:
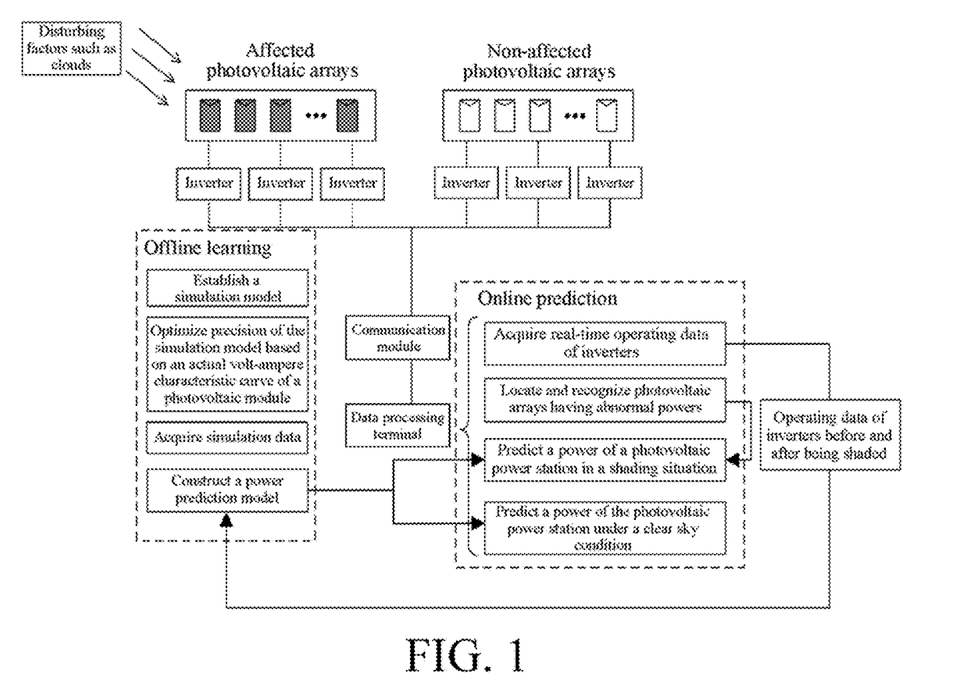
FIG. 1 is structure diagram of a system for power prediction of a photovoltaic power station based on operating data of grid-connected inverters according to an embodiment of the present disclosure.
Figure 2:
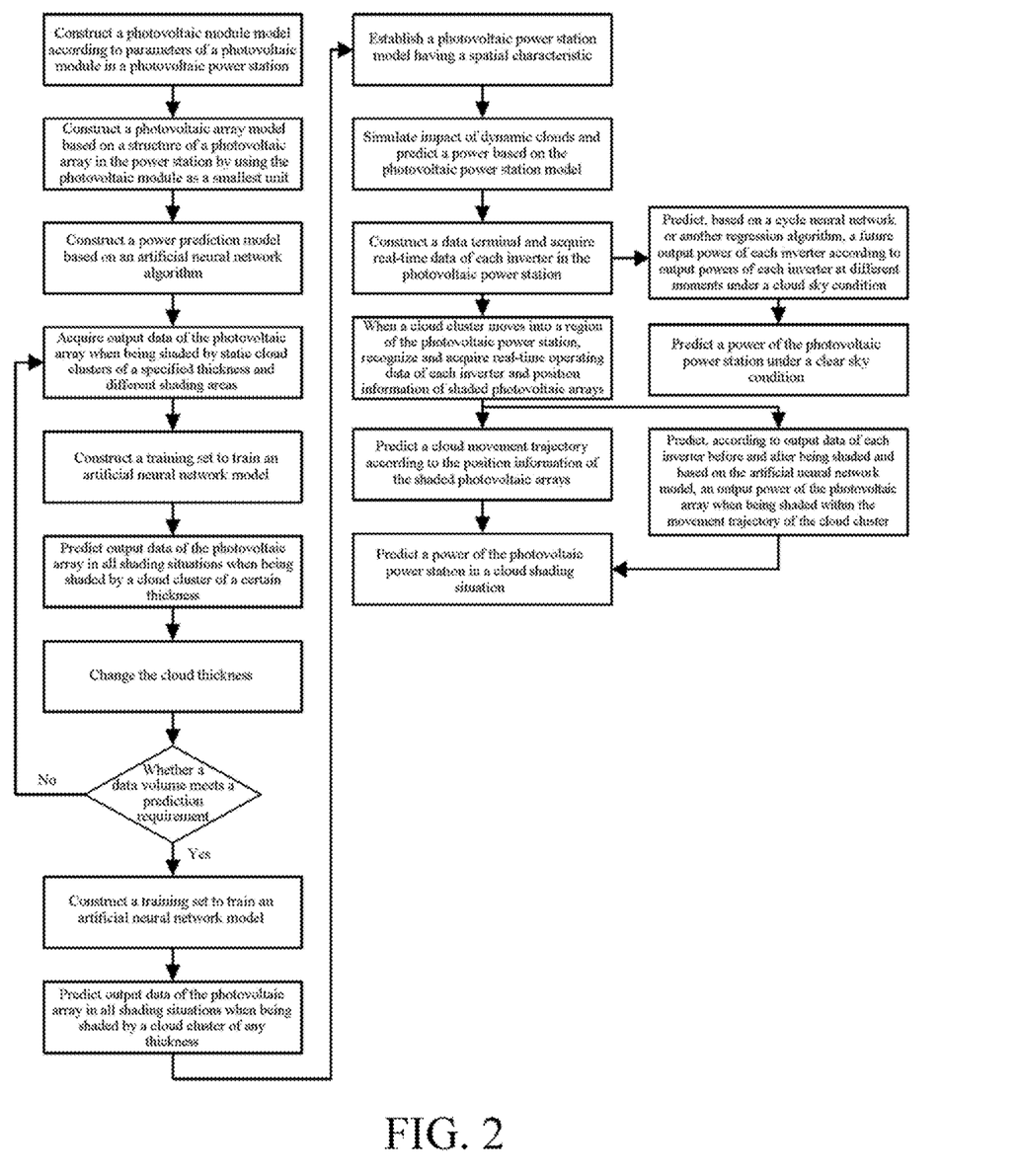
FIG. 2 is a flowchart of a power prediction system according to an embodiment of the present disclosure.

A system and steps for power prediction of a photovoltaic power station based on operating data of grid-connected inverters are shown in FIG. 1 and FIG. 2. The entire power prediction system is divided into two modules: an offline learning module and an online prediction module. The offline learning module includes establishment of a photovoltaic power station simulation model, acquisition of simulation data, and establishment of a power prediction model.

The online prediction module can acquire output data of a photovoltaic array in different shading situations, and use the data as a training set to train the power prediction model constructed in the offline training module, to predict an output power of a photovoltaic array under any working condition. The online prediction module further locates and recognizes, by using real-time operating parameters and a position number transmitted by each inverter to a data terminal, photovoltaic arrays having abnormal powers, and determines a movement direction and speed of a cloud cluster according to a sequence in which the arrays are affected. The output power of the entire photovoltaic power station under a clear sky condition or when being shaded by a cloud cluster is predicted according to a result of the power prediction model and a prediction of a cloud movement trajectory.

The following embodiment is a typical implementation of this application.

According to parameters of a photovoltaic module in a photovoltaic power station which are provided by a manufacturer, a photovoltaic module model is established based on a Newton's method, and a photovoltaic array model is established according to a structure of a photovoltaic array in the photovoltaic power station by using the photovoltaic module model as the smallest unit. The photovoltaic module used by the photovoltaic power station is connected to an inverter, and an output end of the inverter is connected to a load. By controlling the inverter, a voltage of the photovoltaic module is adjusted in a range of zero to an open-circuit voltage at a fixed step, and output current values of the photovoltaic module under different voltage values are acquired, to obtain a volt-ampere characteristic curve of the photovoltaic module. A volt-ampere characteristic curve of the photovoltaic module under different irradiances can be obtained by changing an irradiance received by the module. The obtained volt-ampere characteristic curve is compared with a volt-ampere characteristic curve obtained based on the photovoltaic module model to optimize the module model, so that the volt-ampere characteristic curve obtained based on the photovoltaic module can be highly consistent with an actual volt-ampere characteristic curve of the photovoltaic module.

Due to different positions of the photovoltaic arrays, the thicknesses of dust on the surfaces are different, leading to a difference between an output power of a photovoltaic array used for data acquis ion and output powers of other photovoltaic arrays under a clear sky condition, causing an error in a prediction result. For example, a photovoltaic array has an output power of 9500 W under a clear sky condition and is recorded as photovoltaic array X; another photovoltaic array has an output power of 9400 W under the same clear sky condition due to a different dust thickness, and is recorded as photovoltaic array Y. When both the photovoltaic arrays are shaded by cloud clusters of the same thickness, the output power of the photovoltaic array X becomes 5000 W, and the output power of the photovoltaic array Y becomes a value lower than 5000 W. Therefore, in analysis of cloud cluster shading based on the output data of the photovoltaic arrays, it is necessary to consider a working condition of each photovoltaic array before being shaded. During training of the artificial neural network, it is necessary to add different working conditions of the photovoltaic arrays before being shaded to a model input layer to improve prediction precision. As the photovoltaic power station includes a large quantity of the photovoltaic arrays, there may be an extremely large quantity of different output power values under a clear sky condition. If these different power values are all added to a training set to train the model, the amount of calculation is greatly increased, and a large amount of data needs to be acquired based on the photovoltaic array. Therefore, the output powers of the photovoltaic arrays need to be classified into specific ranges. For example, output powers of the photovoltaic arrays in the photovoltaic power station under a clear sky condition are in a range of 9000 W to 10000 W, and output powers of the inverters are classified by using 100 W as an interval. When output powers of three inverters under a clear sky condition are 9160 W, 9180 W and 9220 W, output powers under a clear sky condition corresponding to an input layer of a training set of an artificial neural network model are all treated as 9200 W.

Figure 3:
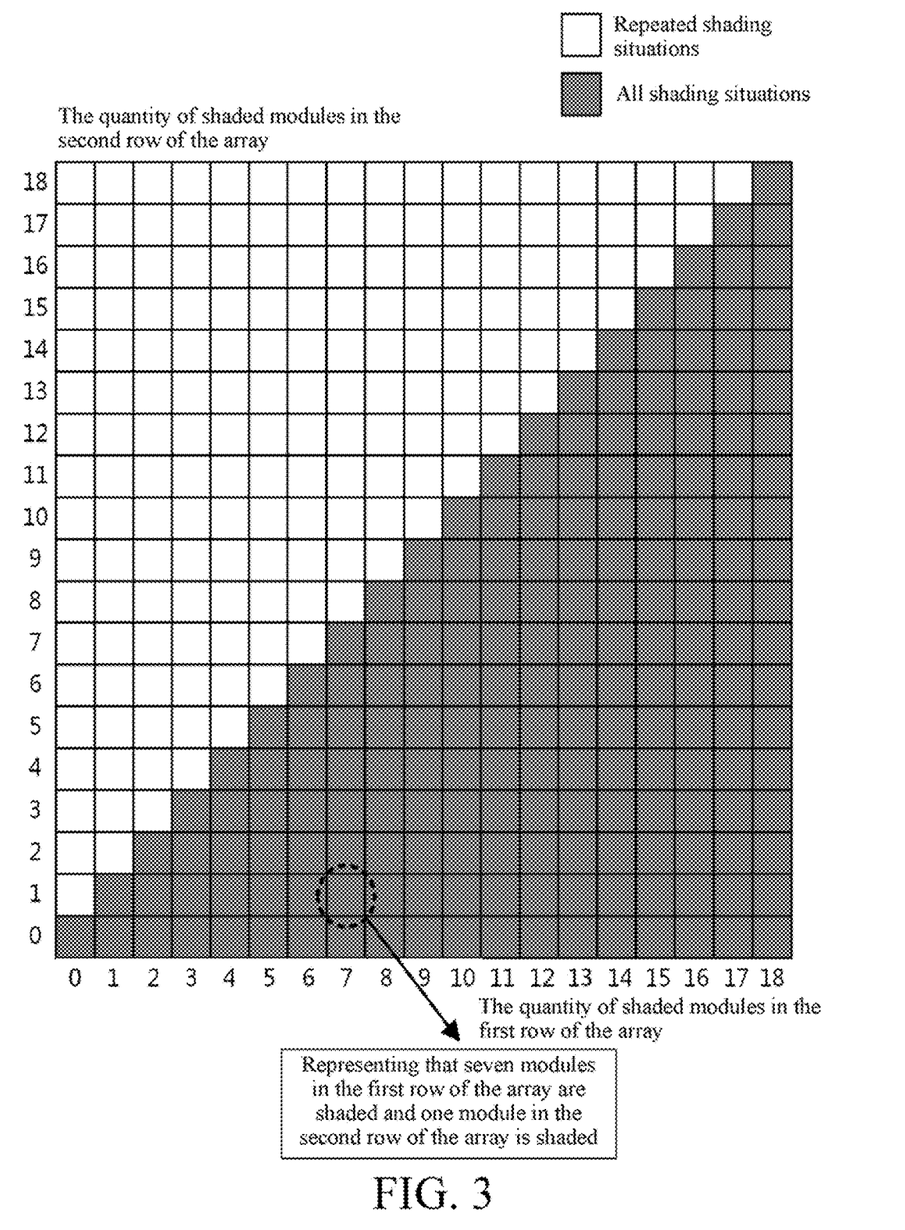
FIG. 3 is a schematic diagram of all shading situations of a photovoltaic array with a 2-row and 18-column structure according to an embodiment of the present disclosure.
Figure 4:
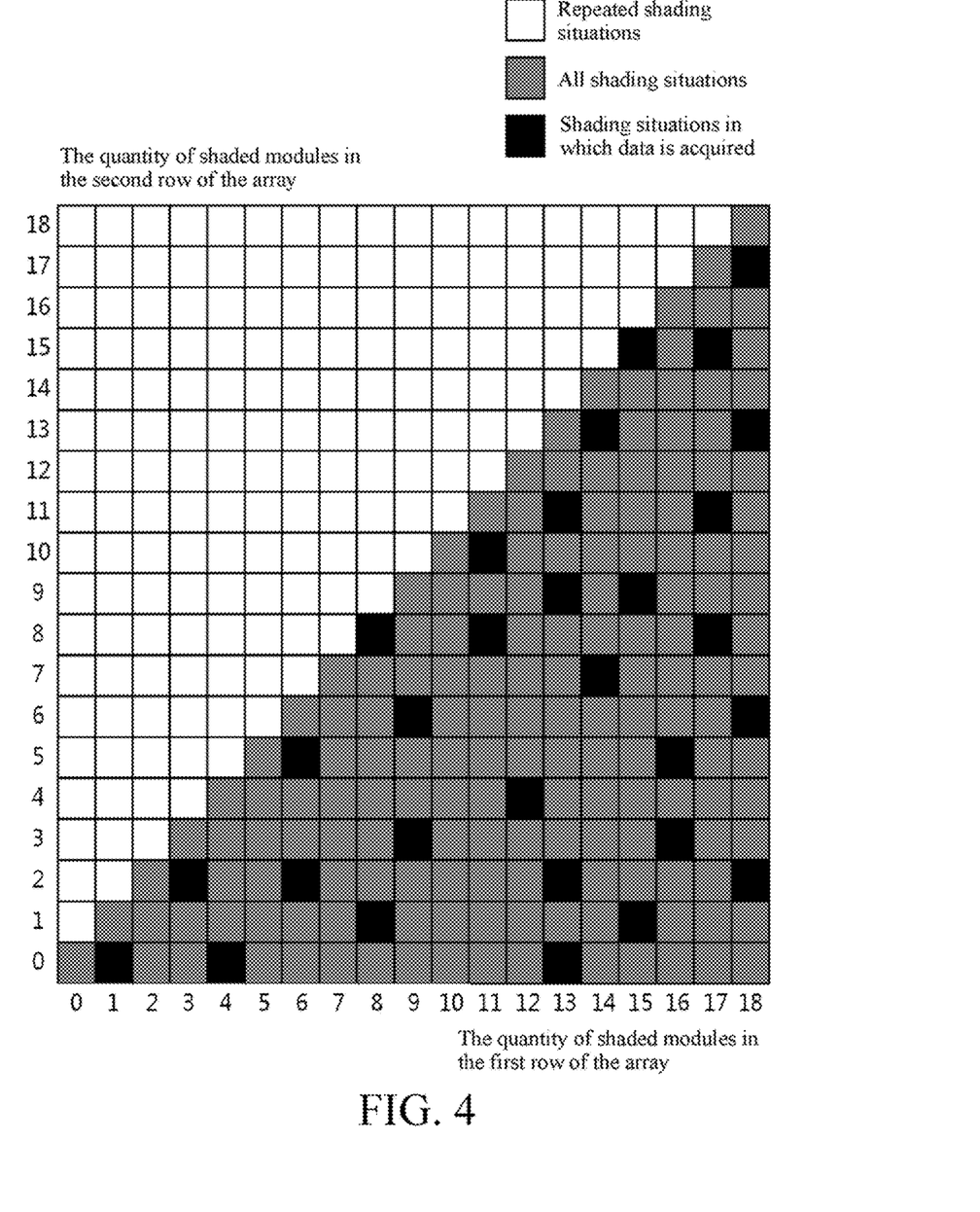
FIG. 4 is a schematic diagram of shading situations in which data acquisition is performed on a photovoltaic array with a 2-row and 18-column structure according to an embodiment of the present disclosure.

A photovoltaic array model is established based on a high-precision photovoltaic module model, and data is acquired. By using a photovoltaic array with 2 rows and 18 columns as an example, when a thickness of a shelter is definite and uniform, as shown in FIG. 3, there are 190 shading situations provided that only different output powers of the photovoltaic arrays are considered. If the array is large, or there are a large quantity of parallel photovoltaic arrays in a single MPPT channel of the inverter, the total amount of shading situations increases exponentially. Therefore, it is impossible to acquire output data of the photovoltaic arrays under all working conditions. According to the method used in the present disclosure, some shading situations are selected for data acquisition, a power prediction model based on an artificial neural network algorithm is established, and output voltages, currents, and powers of the photovoltaic array in all shading situations under different working conditions are predicted by using the acquired data as a training set. A selection method for data acquisition for a photovoltaic array with a 2-row and 18-column structure is shown in FIG. 4. 30 out of 190 shading situations are selected for data acquisition. A training set is constructed using the quantity of shaded modules in the first row of the array, the quantity of shaded modules in the second row of the array, irradiances received by the photovoltaic modules before being shaded, and irradiances received by the photovoltaic modules after being shaded as input values of the training set, and by using an output voltage of the photovoltaic array, an output current of the photovoltaic array, and an output power of the photovoltaic array as output values of the training set, to train an artificial neural network, so that the artificial neural network can predict, based on the acquired output data of the photovoltaic array in the 30 shading situations, output data of the photovoltaic array in the remaining 160 shading situations without data acquisition, and the prediction model can be optimized according to the prediction results.

After output data of the photovoltaic array when being shaded by a cloud cluster of a specified thickness under all working conditions is obtained, impact of cloud clusters of different thicknesses on the photovoltaic array is simulated by changing an irradiance received by each module in the shaded photovoltaic power station. Assuming that impact of different cloud cluster thicknesses on the irradiance received by the photovoltaic module can be reduced from 1000 W/m$^2$ in a standard working condition to a range of 200 W/m$^2$ to 800 W/m$^2$, by using 5 W/m$^2$ as the smallest resolution, there are cloud clusters of 120 different thicknesses. 12 groups of irradiances received by the shaded photovoltaic array are selected in a range of 200 W/m$^2$ to 800 W/m$^2$ by using 50 W/m$^2$ as the smallest resolution, to simulate cloud clusters of 12 thicknesses. The thickness of the cloud cluster may be expressed by an irradiance received by the photovoltaic array after being shaded. For the cloud cluster of each thickness, 30 sets of data are sampled first, and output data of the photovoltaic array under all 190 working conditions are obtained through the artificial neural network model. By repeating the foregoing operation for 12 times, output data of the photovoltaic array when being shaded by the cloud clusters of 12 thicknesses under all working conditions can be finally obtained. The training set is constructed, and output voltages, currents, and powers of the photovoltaic array when being shaded by clouds of all 120 thicknesses, any sizes and any areas can be predicted based on the constructed artificial neural network model. The artificial neural network algorithm can be optimized according to the prediction precision.

Figure 5:
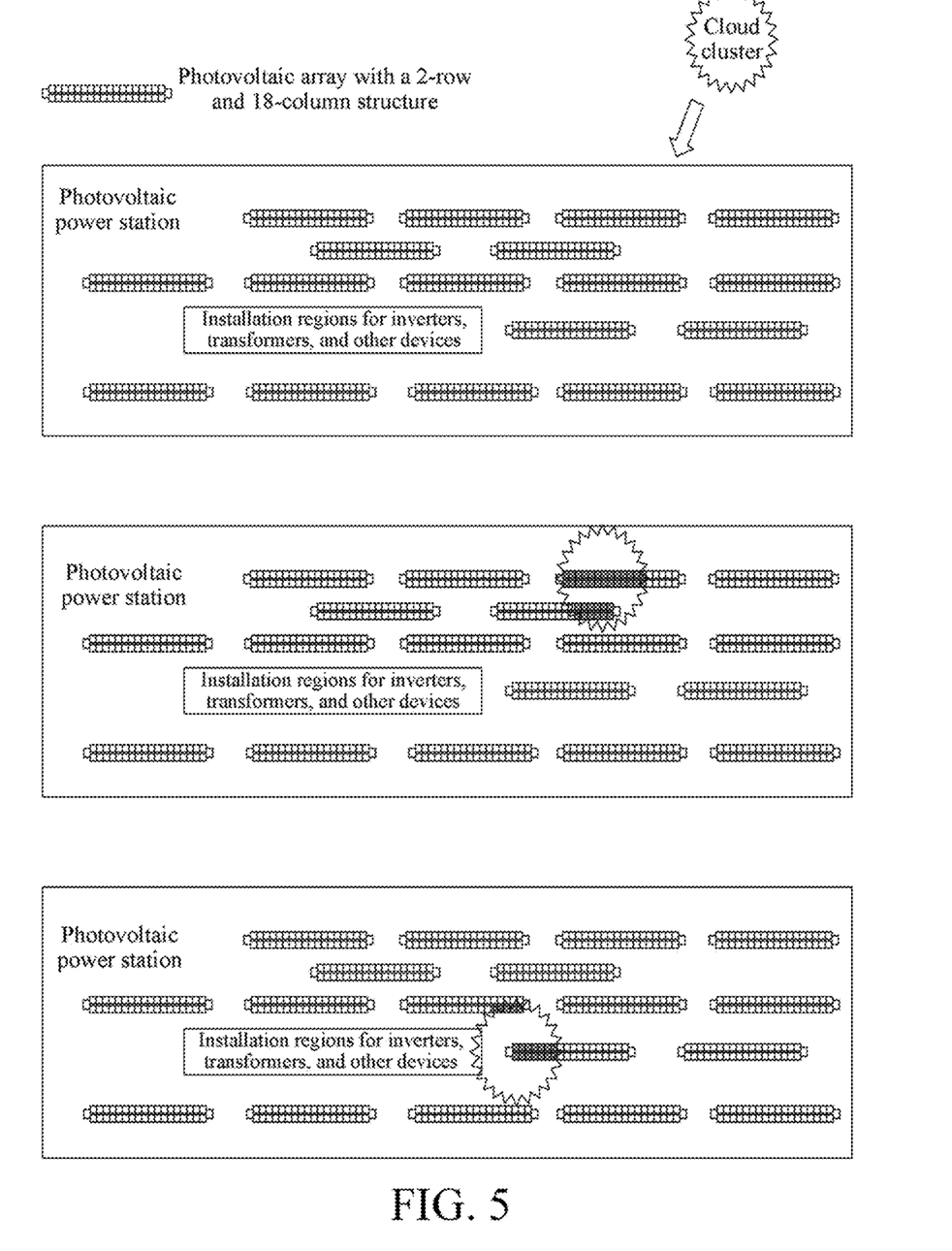
FIG. 5 is a schematic diagram of shading states of a photovoltaic power station, shaded a dynamic cloud cluster, at different moments according to an embodiment of the present disclosure.

After the output data of the photovoltaic array in different static shading situations is obtained, a photovoltaic power station model having a spatial characteristic is established to simulate impact of dynamic clouds on the output power of the photovoltaic power station. According to the distribution of the photovoltaic arrays in the photovoltaic power station, positions of the arrays and an actual distance between arrays are measured, and each array is numbered. A photovoltaic power station model as shown in FIG. 5 is constructed based on an actual layout of the photovoltaic power station. As shown in FIG. 5, when a dynamic cloud cluster passes through a region of a photovoltaic power station, impact on different photovoltaic arrays at different moments is different. A movement direction and speed of the cloud cluster can be simulated according to a time sequence in which the different arrays are affected. By setting irradiances received by photovoltaic modules in each photovoltaic array according to a time sequence, impact of cloud clusters of different thicknesses, movement directions, and movement speeds on the photovoltaic power station can be simulated.

When an unknown cloud cluster enters the region of the photovoltaic power station, according to output data changes of the shaded photovoltaic power station, a movement direction and a movement speed of the cloud cluster are predicted according to a sequence in which photovoltaic arrays at different positions are affected by the cloud cluster and time intervals at which the photovoltaic arrays are affected, in combination with a distance between the photovoltaic arrays. Based on the previously constructed power prediction model, in combination with a prediction of a movement trajectory of the cloud cluster and output data of photovoltaic arrays shaded at previous moments, future output powers of photovoltaic arrays within the movement trajectory of the cloud cluster are predicted. Finally, output powers of photovoltaic arrays when being shaded by the cloud cluster can be predicted, After training of the artificial neural network model, the entire power prediction system can implement online power prediction of the photovoltaic power station according to real-time inverter operating parameters received by a data terminal.

In a case that the photovoltaic power station is not shaded by a cloud cluster, a future changing trend of the output power can be predicted according to output powers of each inverter at previous moments. As time changes, the variation of the irradiance is a temporal variation. Therefore, the output power of the photovoltaic power station under a clear sky condition can be predicted by using a recurrent neural network algorithm.

In a case that the photovoltaic power station is shaded by a cloud cluster, inverter whose powers decrease greatly are recognized based on a disposed data processing terminal and an existing real-time monitoring system of the photovoltaic power station. In addition, shaded positions are determined according to position numbers of corresponding photovoltaic arrays uploaded by the inverters, and a shading type is analyzed according to output voltages, currents, and powers of inverters at different positions before and after being shaded. After sampling at several consecutive moments, by analyzing a sequence in which the photovoltaic arrays at different positions are affected by the cloud cluster and time intervals at which the photovoltaic arrays are affected, in combination with position information of the photovoltaic arrays, the movement direction and movement speed of the cloud cluster can be predicted. Based on the artificial neural network model in combination with the prediction of the movement trajectory of the cloud cluster, future output powers of the photovoltaic array when being shaded by the cloud cluster within the movement trajectory of the cloud cluster can be predicted, and finally the power of the entire photovoltaic power station can be predicted.

It should be understood that, in description of the present disclosure, description of reference terms such as "an embodiment", "another embodiment", "other embodiments", or "a first embodiment to an $N^{th}$ embodiment" means that specific features, structures, materials, or features described in the embodiment or example are included in at least one embodiment or example of the present disclosure. In this specification, schematic descriptions of the foregoing terms do not necessarily refer to the same embodiment or example. Moreover, the specific features, structures, materials, or characteristics described may be combined in any one or more embodiments or examples in an appropriate manner.

The foregoing descriptions are merely preferred embodiments of the present disclosure, but are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A method for power prediction of a photovoltaic power station based on operating data of grid-connected inverters, the method comprising:
constructing a photovoltaic module model according to parameters of a photovoltaic module in a photovoltaic power station, constructing a photovoltaic array model based on a series and parallel combination of the photovoltaic module models, and establishing a photovoltaic power station model based on an arrangement structure of photovoltaic arrays in the photovoltaic power station;
constructing a photovoltaic array power prediction model based on an artificial neural network algorithm and the photovoltaic power station model;
acquiring output data of the photovoltaic array when being shaded by static shadows of different thicknesses and different shading areas, wherein the output data is the output power by setting several sets of known thickness occlusion, simulating multiple occlusion conditions of each thickness and collecting and storing the output voltage, current and power of the photovoltaic array under different shielding conditions, constructing a training set to train the photovoltaic array power prediction model, and obtaining a trained photovoltaic array power prediction model; and
acquiring, classifying, and normalizing output powers of real-time operating data of an inverter when the photovoltaic array is under a clear sky condition, and predicting an output power of the entire photovoltaic power station by using the trained photovoltaic array power prediction model, the power prediction comprising a rolling prediction of the output power of the photovoltaic power station under the clear sky condition and a minute-level power prediction of the photovoltaic power station when being shaded by a dynamic cloud cluster.

2. The method for power prediction of a photovoltaic power station based on operating data of grid-connected inverters according to claim 1, wherein
an actual photovoltaic module is connected to an adjustable load; a volt-ampere characteristic curve of the photovoltaic module is obtained by adjusting a voltage of the photovoltaic module in a range of zero to an open-circuit voltage with a fixed step and acquiring output current values of the photovoltaic module under different voltage values;
and a volt-ampere characteristic curve of the photovoltaic module under different irradiances is obtained by changing an irradiance received by the actual photovoltaic module; and
the obtained two actual volt-ampere characteristic curves are compared with a volt-ampere characteristic curve obtained based on the photovoltaic module model to correct related parameters of the photovoltaic module model.

3. The method for power prediction of a photovoltaic power station based on operating data of grid-connected inverters according to claim 1, wherein
the photovoltaic module model is a five-parameter photovoltaic module model;
five parameters under an actual working condition, namely, a diode ideality factor A, a series resistance $R_S$, a parallel resistance $R_{sh}$, a saturation current $I_s$, and a photo-generated current $I_{ph}$ are calculated to finally obtain a volt-ampere characteristic curve under different working conditions, and when the diode ideality factor is given, the other four parameters are calculated based on a formula, by comparing the actual volt-ampere characteristic curve with the volt-ampere characteristic curve based on the photovoltaic module model, and the relevant parameters of the photovoltaic module model were modified to improve the simulation accuracy of the model.

4. The method for power prediction of a photovoltaic power station based on operating data of grid-connected inverters according to claim 3, wherein
when the 5 parameters under an actual working condition are calculated, the volt-ampere characteristic curve of the photovoltaic module under different working conditions is obtained based on a Newton's method; and
data processing is performed based on series and parallel characteristics of the photovoltaic modules by using one photovoltaic module as a smallest unit, and a volt-ampere characteristic curve of the entire photovoltaic array is finally obtained.

5. The method for power prediction of a photovoltaic power station based on operating data of grid-connected inverters according to claim 1, wherein
outputs of the photovoltaic array under different working conditions are simulated and acquired, the output data of the photovoltaic array is classified according to irradiances under a clear sky condition, and each group of data forms a training set to train an artificial neural network; and
the acquired original output data of the photovoltaic array needs to be normalized before being used for training the artificial neural network, and a linear transformation is performed on the original data so that a result is mapped to a range of 0 to 1.

6. The method for power prediction of a photovoltaic power station based on operating data of grid-connected inverters according to claim 1, wherein construction and training of the power prediction model are divided into two steps:
predicting impact of a cloud cluster of a specified thickness, any size and any shape on an output power of the photovoltaic array; and
predicting impact of a cloud cluster of any thickness, any size, and any shape on the output power of the photovoltaic array.

7. The method for power prediction of a photovoltaic power station based on operating data of grid-connected inverters according to claim 1, wherein the photovoltaic power station model is constructed with reference to a spatial characteristic of the photovoltaic arrays in the photovoltaic power station by using a single photovoltaic array model as a smallest unit;

the spatial characteristic of the photovoltaic array arrangement in the photovoltaic power station is simulated based on different shading moments and different shading areas of different photovoltaic arrays by the same dynamic cloud cluster; and positions of the photovoltaic arrays in the photovoltaic power station model are numbered, and position information of the cloud cluster is provided.

8. A system for power prediction of a photovoltaic power station based on operating data of grid-connected inverters, the system comprising:

an offline learning module, configured to construct a photovoltaic module model according to parameters of a photovoltaic module in a photovoltaic power station, construct a photovoltaic array model based on a series and parallel combination of the photovoltaic module models, and establish a photovoltaic power station model based on an arrangement structure of photovoltaic arrays in the photovoltaic power station;

construct a photovoltaic array power prediction model based on an artificial neural network algorithm and the photovoltaic power station model; and acquire output data of the photovoltaic array when being shaded by static shadows of different thicknesses and different shading areas, wherein the output data is the output power by setting several sets of known thickness occlusion, simulating multiple occlusion conditions of each thickness and collecting and storing the output voltage, current and power of the photovoltaic array under different shielding conditions, construct a training set to train the photovoltaic array power prediction model, and obtain a trained photovoltaic array power prediction model; and an online prediction module, configured to acquire, classify, and normalize output powers of real-time operating data of an inverter when the photovoltaic array is under a clear sky condition, and predict an output power of the entire photovoltaic power station by using the trained photovoltaic array power prediction model, the power prediction comprising a rolling prediction of the output power of the photovoltaic power station under the clear sky condition and a minute-level power prediction of the photovoltaic power station when being shaded by a dynamic cloud cluster.

9. The system for power prediction of a photovoltaic power station based on operating data of grid-connected inverters according to claim 8, wherein the online prediction module locates and recognizes, by using real-time operating parameters and a position number transmitted by each inverter to a data terminal, photovoltaic arrays having abnormal powers, and determines a movement direction and speed of the cloud cluster according to a sequence in which the arrays are affected, and the output power of the entire photovoltaic power station under a clear sky condition or when being shaded by a cloud cluster is predicted according to a result of the photovoltaic array power prediction model and a prediction of a cloud movement trajectory.

* * * * *